Sept. 12, 1967  G. BURR ETAL  3,340,807
EXPLODING WIRE TECHNIQUES

Filed Oct. 4, 1965  2 Sheets-Sheet 1

INVENTORS.
GERALD BURR
MARK B. LEEDS
STANFORD B. SILVERSCHOTZ
Richard J. Seligman
ATTORNEY Sept. 12, 1967 G. BURR ETAL 3,340,807
EXPLODING WIRE TECHNIQUES
Filed Oct. 4, 1965 2 Sheets-Sheet 2

INVENTORS.
GERALD BURR
MARK B. LEEDS
STANFORD B. SILVERSCHOTZ
Richard J. Seligman
ATTORNEY United States Patent Office 3,340,807
Patented Sept. 12, 1967

3,340,807
EXPLODING WIRE TECHNIQUES
Gerald Burr, Clifton, N.J., Mark B. Leeds, Forest Hills, N.Y., and Stanford B. Silverschotz, Livingston, N.J., assignors to International Telephone and Telegraph Corporation, Nutley, N.J., a corporation of Maryland
Filed Oct. 4, 1965, Ser. No. 492,593
6 Claims. (Cl. 102—23)

ABSTRACT OF THE DISCLOSURE

A method for fracturing a block of material by embedding a wire therein and causing the wire to rapidly vaporize, with the resultant large shock wave causing the fracture.

---

This invention relates to a method for fracturing a solid and more particularly to a method employing "exploding wire" phenomenon techniques to cause physical destruction of a solid, and to an article using such techniques.

Using an explosive force to shear, fracture or fragmentize a solid of material is well known. One important application is the use of an explosive force to provide quick release of an object from a structure by destruction of the fastening means. Explosive forces are used, for example, to provide release of a load from an airplane while in flight, release of a hatch from a space capsule, etc. They also find use in missile destaging systems.

One method of providing quick release is to fasten the load, to be released, to the structure utilizing "explosive bolts." Quick release is achieved by causing a shearing of the bolt.

Conventional types of explosives have inherent disadvantages, such as susceptibility to shock, radio frequency radiation, etc. One method of effecting physical destruction without being encumbered by these disadvantages is to make use of "exploding wire" phenomenon techniques; that is, to utilize the energy released when a wire is "exploded" as the source of explosive force.

The "exploding wire" phenomenon is well known in the prior art and considerable scientific research has been expended in investigating this phenomenon. Yet, most of the development to date has been concerned with what causes the phenomenon, particularly studying the generated shock waves.

Some practical applications have been made of this phenomenon to date, for example, utilizing the flash produced during an explosion as a short intense light source, using the highly-ionized vapor produced during the explosion as a plasma source, etc., but little application has been made of the physical explosive force itself to cause physical destruction.

The prior art shows exploding wires employed to fire an explosive material, which material in turn triggers a large explosive charge. That is, use of exploding wires as detonators.

Accordingly, it is an object of this invention to provide a method of fragmentizing a structure utilizing "exploding wire" phenomenon techniques.

Another object of this invention is to provide a method of shearing a member using "exploding wire" phenomenon techniques.

A further object of this invention is to provide a fastener which can be unfastened using "exploding wire" phenomenon techniques.

In achieving the foregoing objects, a method is provided for fracturing, shearing, or fragmentizing a block of plastic by embedding a wire therein, and causing the wire to rapidly vaporize. The resulting large shock wave generated will cause fracturing, shearing or fragmentization of the block of plastic.

The above-mentioned and other features and objects of this invention will become more apparent by reference to the following description taken in conjunction with the accompanying drawings, in which.

Figure 1:
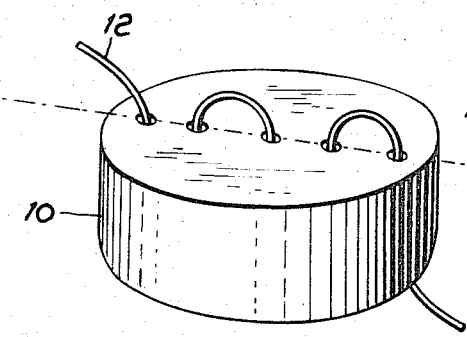
FIGURE 1 is a perspective view of a block of material to be fractured showing the "exploding wire" which is embedded therein.
Figure 2:
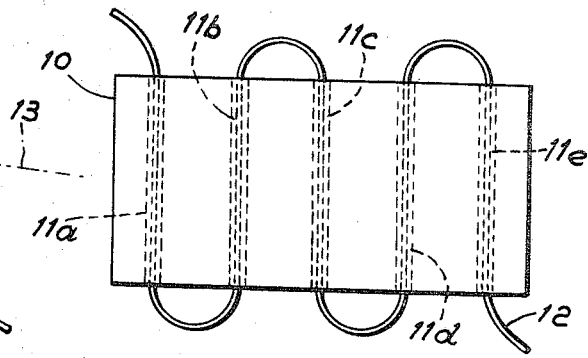
FIGURE 2 is an elevational view of the embodiment shown in FIGURE 1 showing the embedded wire in outline.

FIGURES 1 and 2 illustrate an embodiment demonstrating the principle of this invention; there is shown a block 10, preferably comprised of a plastic material, which is to be fractured. A plurality of holes 11a–11e are drilled in block 10; the holes are dimensioned a little larger than the diameter of a wire 12 which is to be threaded therein. Wire 12 is preferably threaded in a serpentine fashion.

The location of the holes 11 is selected in accordance with the manner in which block 10 is to be fractured; that is, whether block 10 is to be sheared along a plane, fragmentized or irregularly broken. FIGURES 1 and 2 show holes 11 lying along a line 13 which defines a vertical plane along which separation of block 10 is to occur. The holes can also be drilled in an irregular pattern to cause an irregular rupture of the block or fragmentization thereof.

Figure 3:
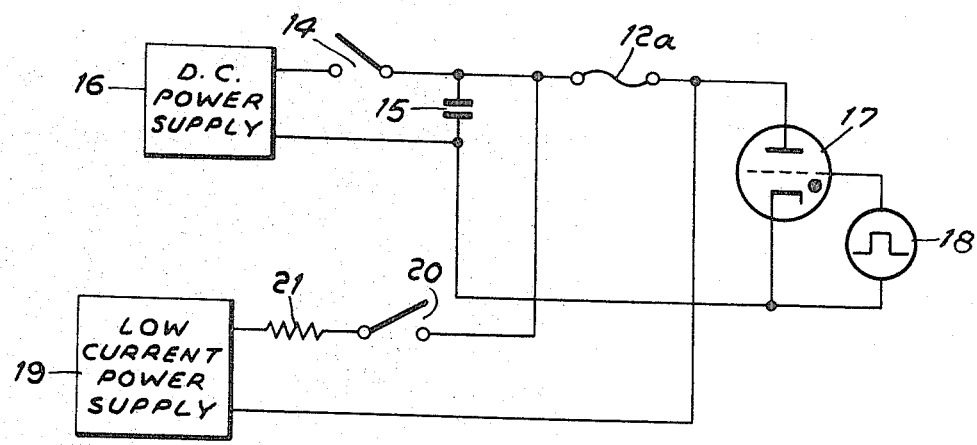
FIGURE 3 is a schematic diagram illustrating a circuit for pulsing the "exploding wire" of FIGURES 1 and 2.
Figure 4:
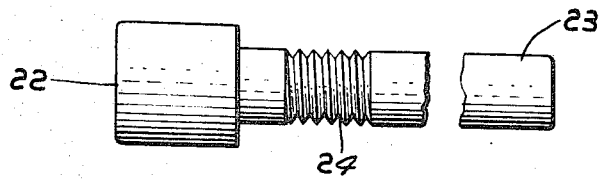
FIGURE 4 is a side elevation of an exploding bolt.

FIGURE 3 illustrates a typical circuit for exploding the wire. Upon closing a switch 14 a capacitor 15 will charge to a voltage as determined by a D.C. power supply 16. Capacitor 15 is coupled to a wire 12a which is to be exploded. The switching mechanism for discharge of capacitor 15 through wire 12a is a hydrogen thyratron 17 triggered by a pulse generator 18. It is obvious that using a hydrogen thyratron switch is only one method of discharging capacitor 15 through wire 12a. Other switches such as a triggered spark gap would be equally satisfactory.

In order to achieve optimum results when fracturing a solid block of material using the above-described "exploding wire" phenomenon technique, it is preferred that the wire be in intimate contact with the solid to be fractured. If the wire is not in intimate contact with the solid of material, a poor coupling results which leads to a partial dissipation of the shock wave.

In order to achieve intimate contact between the wire and the solid of material a light current is applied from source 19 via switch 20 and resistor 21 to wire 12 (FIGURE 3); thus causing the wire to heat up, which results in the walls defining holes 11a–11e to melt and "flow," fusing to wire 12 upon removal of the current.

Figure 5:
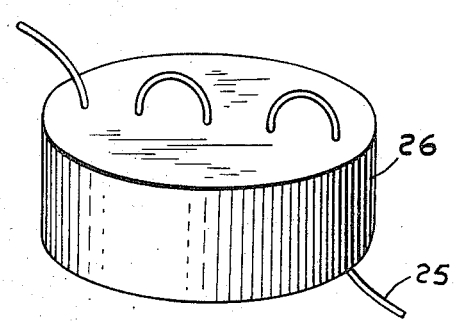
FIGURE 5 is a perspective view illustrating an "exploding wire" molded in a block of material.

FIGURE 5 illustrates another embodiment demonstrating the principle of this invention; there is shown a wire 25 molded into a block 26. In this embodiment no drilling is required, and intimate contact is assured without the initial application of a light current to melt the solid of material surrounding the wire. Since no initial melting is required any material could be fractured in this manner, e.g., a thermosetting plastic or even a metal (of course, if a metal is to be fractured the "exploding wire" would require some insulation).

Figure 6:
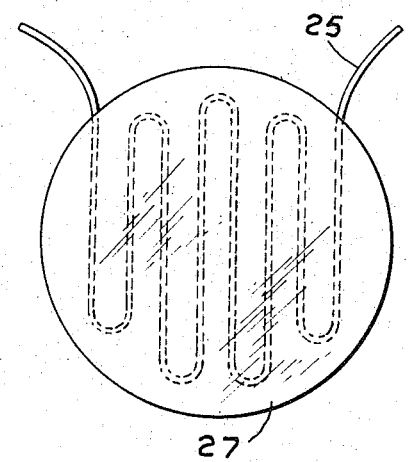
FIGURE 6 is a plan view illustrating an "exploding wire" embedded in a wafer.
Figure 7:
FIGURE 7 is a side elevational view of the wafer illustrated in FIGURE 6.

Since the wire used is often very thin and fragile, and not easily centered in a large mold, a preliminary step is often taken of molding the wire into a wafer 27 (FIGS. 6 and 7) before molding into the large solid of material to be fractured. That is initially wire 25 is molded into wafer 27 and then wafer 27 is molded with a material to form solid 26.

One application of "exploding wire" phenomenon techniques applied to exploding a solid of material is in the construction of an "explosive bolt." It is well known to use "explosive bolts" to provide quick release of an object from a larger body; for example, a bomb released from a bomb rack mounted beneath the wings of an aircraft. The "explosive bolt" could include a head 22 similar to block 10 of FIGURES 1 and 2 or block 25 of FIGURE 6; or the shank 23 could be an elongated version of block 10 or block 25 with external threads 24 on a portion thereof. The exploding wire could be located in head 22 or shank 23. If the "explosive bolts" are made of a plastic material, and are sheared using a method similar to that described in conjunction with FIGURES 1, 2 and 5, many disadvantages associated with ordinary metal "explosive bolts" are avoided. Constructing the bolt of a plastic material permits easy working of the material such as molding to "odd" sizes and configurations, etc. Also, there is the advantage of using "exploding wire" techniques rather than conventional explosives which as mentioned above are susceptible to shock, radio frequency radiation, etc.

Some illustrative materials and values used in application of the embodiment shown in the drawings are as follows:

Plastic solid material—polymer resins (such as Lexan or Delrin)
Wire—10 mil Nichrome or nickel
Diameter of plastic block—0.25 to 1 inch
Length of wire—4 inches
Number of wire passes—1 to 3
Firing voltage—8 to 11 kv.
Capacitor—4 microfarads
Hydrogen thyratron—Kuthe type 5948A Other values of capacity, firing voltage, diameter of wire, etc. can be used, the above-mentioned values merely being typical of those used during the reduction to practice of this invention. Other wires which also can be used are iron, silver, platinum, gold-copper, etc.

While we have described above the principles of our invention in connection with specific apparatus, it is to be clearly understood that this description is made only by way of example and not as a limitation on the scope of our invention as set forth in the accompanying claims.

We claim:
1. A method of fracturing a solid of material comprising the steps of:
   forming a plurality of holes in the material;
   threading a wire through said holes;
   applying a small electrical current to said wire to cause the walls defining said holes to soften and fuse to said wire to form an intimate contact therewith; and
   pulsing said wire with a high energy electrical current pulse so that said wire vaporizes, generating a shock wave which fractures the material.
2. The method of claim 1 wherein said holes initially have a diameter slightly larger than the diameter of the wire to be embedded therein.
3. The method of claim 1 wherein said wire is threaded in a serpentine fashion to define a plane along which fracture of the material will occur.
4. The method of claim 1 wherein said high energy electrical pulse is generated by charging a large capacity capacitor to a high voltage and then rapidly discharging said capacitor.
5. The method of claim 4 wherein said capacitor is discharged by the triggering of a hydrogen thyratron.
6. A method of fracturing a solid of material comprising the steps of:
   forming a plurality of holes in the material;
   threading a wire through said holes in a serpentine fashion to define a plane along which fracture of the material will occur; and
   pulsing said wire with a high energy electrical current pulse so that said wire vaporizes, generating a shock wave which fractures the material.

References Cited
UNITED STATES PATENTS

| | | | |
|---|---|---|---|
| 2,906,206 | 9/1959 | Morison et al. | 102—70.2 |
| 2,926,566 | 3/1960 | Atkins et al. | 102—28 |
| 3,062,574 | 11/1962 | Buntenbach et al. | 102—28 |
| 3,100,447 | 8/1963 | Betts | 102—28 |
| 3,188,914 | 6/1965 | Dahl | 89—1 |
| 3,208,379 | 9/1965 | McKee et al. | 102—28 |
| 3,237,521 | 3/1966 | Francis | 89—1 |

BENJAMIN A. BORCHELT, *Primary Examiner.*

V. R. PENDEGRASS, *Assistant Examiner.*